(12) United States Patent
Lin

(10) Patent No.: US 8,684,620 B2
(45) Date of Patent: Apr. 1, 2014

(54) PUSH BUTTON-CONTROLLED RETRACTABLE BAR

(76) Inventor: Thomas Lin, Taichung (TW)

(*) Notice: Subject to any disclaimer, the term of this patent is extended or adjusted under 35 U.S.C. 154(b) by 20 days.

(21) Appl. No.: 13/597,572

(22) Filed: Aug. 29, 2012

(65) Prior Publication Data
US 2014/0064842 A1 Mar. 6, 2014

(51) Int. Cl.
*B25G 1/04* (2006.01)
(52) U.S. Cl.
USPC ....... 403/109.7; 403/109.3; 16/429; 81/177.2
(58) Field of Classification Search
USPC ................. 16/113.1, 405, 427, 429, DIG. 24;
403/109.1, 109.3, 109.7, 109.8, 322.3;
81/177.2, 53.1
See application file for complete search history.

(56) References Cited

U.S. PATENT DOCUMENTS

| | | | | |
|---|---|---|---|---|
| 5,664,792 A * | 9/1997 | Tseng | .............................. | 279/77 |
| 5,704,725 A * | 1/1998 | Horing | ....................... | 403/109.3 |
| 5,727,898 A * | 3/1998 | Lu | ................................ | 403/325 |
| 6,370,990 B1 * | 4/2002 | Lin | .............................. | 81/177.2 |
| 6,883,208 B1 * | 4/2005 | Huang | ............................. | 16/429 |
| 7,144,180 B2 * | 12/2006 | Stahle et al. | ................ | 403/109.1 |
| 7,373,708 B2 * | 5/2008 | Stahle et al. | ..................... | 29/434 |
| 7,774,901 B1 * | 8/2010 | Huang | ............................. | 16/429 |
| 8,328,454 B2 * | 12/2012 | McAndrews et al. | ...... | 403/109.7 |
| 2013/0185945 A1 * | 7/2013 | Wang | .............................. | 30/341 |

FOREIGN PATENT DOCUMENTS

TW I337118 B 2/2011

* cited by examiner

*Primary Examiner* — Joshua Kennedy
(74) *Attorney, Agent, or Firm* — Muncy, Geissler, Olds & Lowe, P.C.

(57) ABSTRACT

A retractable bar using a positioning spring leaf and a control device to control positioning between an inner tube and an outer tube is disclosed. The control device includes a movable member, a push button, and a linking device connected between the movable member and the push button. When the push button is not pushed by an external force, the positioning spring leaf will be pushed by the movable member to force its positioning protrusions into engagement with locating notches of the inner tube to lock the outer and inner tubes. When the push button is pushed by an external force, the linking device will be forced to move the movable member away from the positioning spring leaf, causing the positioning spring leaf to disengage the positioning protrusions from the locating notches of the inner tube.

17 Claims, 12 Drawing Sheets

PUSH BUTTON-CONTROLLED RETRACTABLE BAR

BACKGROUND OF THE INVENTION

1. Field of the Invention

The present invention relates to a retractable bar for tool and more particularly, to a push button-controlled retractable bar.

2. Description of the Related Art

To fit different application distances, regular hand tools (for example, garden shears) commonly provide a retractable design to enhance application convenience. Conventional retractable tool handles are commonly designed to achieve positioning between an inner tube and an outer tube by means of friction interference after through a relative rotary motion therebetween. However, this positioning method can easily cause the inner tube and the outer tube to become loosened from each other.

To eliminate the aforesaid problem, Taiwan Patent Publication Number I337118 discloses a retractable tool bar, which achieves positioning between an inner tube and an outer tube subject to a multi-step linking relationship among a control button, a link, a control block and a positioning post. However, this design has a complicated structure. An improvement in this regard is desired.

SUMMARY OF THE INVENTION

The present invention has been accomplished under the circumstances in view. It is the main object of the present invention to provide a push button-controlled retractable bar, which has the characteristics of simple structure and high positioning accuracy.

To achieve this and other objects of the present invention, a push button-controlled retractable bar comprises an inner tube, an outer tube, a slide seat, a positioning spring leaf, a control device, and an elastic member. The inner tube comprises a longitudinal sliding groove and at least one series of locating notches located on at least one of two opposite sidewalls of the longitudinal sliding groove and spaced along an axial direction of said inner tube. The outer tube is axially movably sleeved onto the inner tube. The slide seat is movably mounted in the longitudinal sliding groove and affixed to the outer tube, comprising an elongated slot. The positioning spring leaf comprises a mounting axle affixed to the slide seat, at least one first arm portion outwardly extended from the mounting axle, and at least one positioning protrusion outwardly protruded from the at least one first arm portion in a direction toward the at least one series of locating notches of the inner tube. The control device comprises a movable member mounted in the longitudinal sliding groove of the inner tube, a push button, and a linking device set between the movable member and the push button. The movable member comprises a push block inserted into the elongated slot of the slide seat and abutted against the at least one first arm portion of the positioning spring leaf. The push button is mounted in the outer tube and movable between a first position where the push block of the movable member pushes the at least one first arm portion of the positioning spring leaf to force the at least one positioning protrusion into engagement with the at least one series of locating notches of the inner tube, and a second position where the push button pushes the linking device to carry the movable member in a direction away from the positioning spring leaf for enabling the positioning spring leaf to move the at least one positioning protrusion away from the at least one series of locating notches of the inner tube subject to its elastic restoring force. The elastic member is set between the slide seat and the movable member, and adapted to push the movable member in a direction toward the positioning spring leaf.

In conclusion, the push button-controlled retractable bar of the present invention uses the push button, the linking device and the slide seat to move the at least one positioning protrusion of the positioning spring leaf into engagement with, or away from, the at least one series of locating notches of the inner tube accurately, facilitating length adjustment.

DETAILED DESCRIPTION OF THE INVENTION

Figure 1:
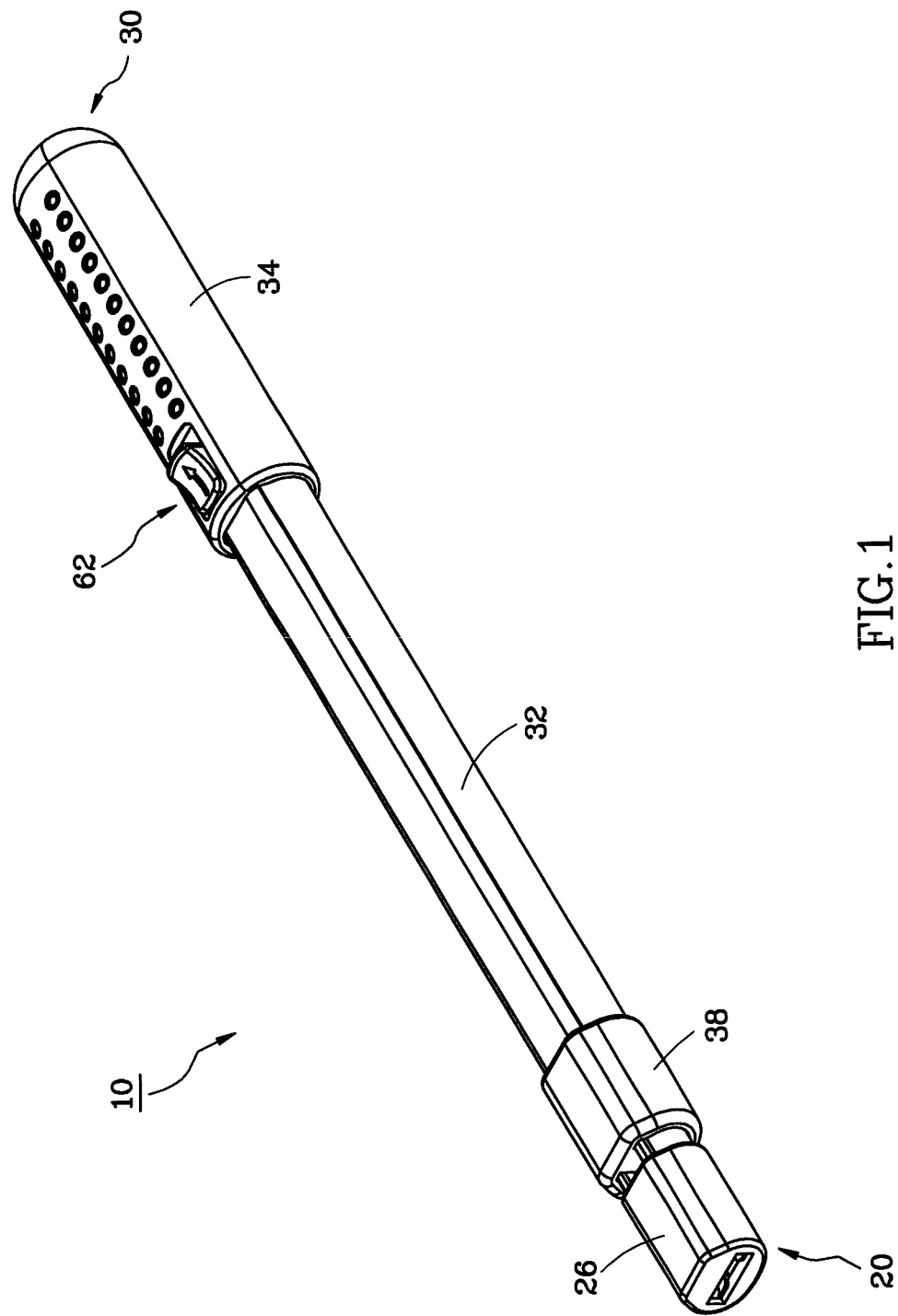
FIG. 1 is a perspective view of a push button-controlled retractable bar in accordance with a first embodiment of the present invention.
Figure 2:
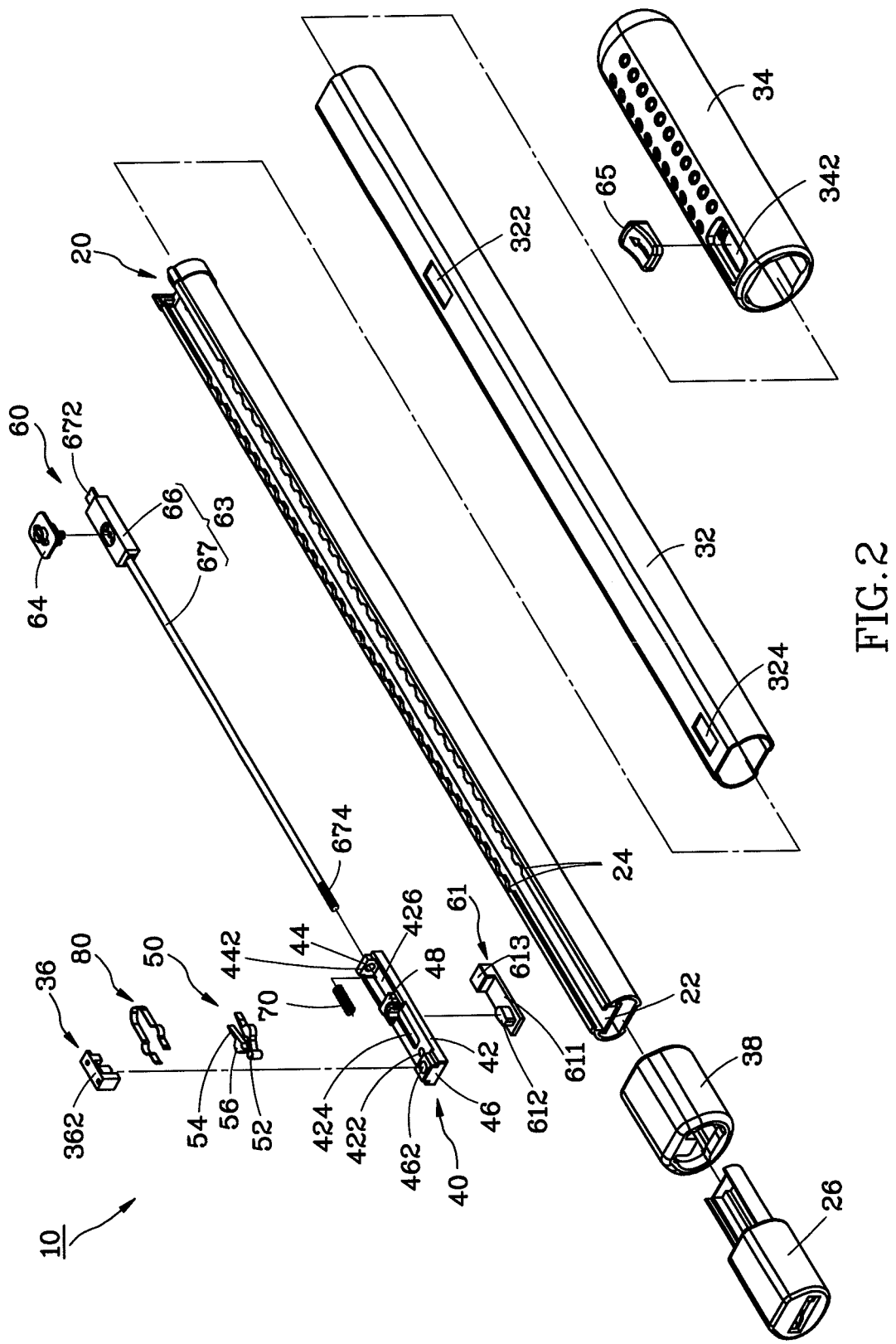
FIG. 2 is an exploded view of the push button-controlled retractable bar in accordance with the first embodiment of the present invention.

Referring to FIGS. 1 and 2, a push button-controlled retractable bar 10 in accordance with a first embodiment of the invention is shown. The push button-controlled retractable bar 10 comprises an inner tube 20, an outer tube 30, a slide seat 40, a positioning spring leaf 50, a control device 60, and an elastic member 70.

The inner tube 20 comprises a longitudinal sliding groove 22, two series of locating notches 24 respectively located on two opposite sidewalls of the longitudinal sliding groove 22 and spaced along the axial direction of the inner tube 20. Further, an end block 26 is fastened to one end of the inner tube 20.

The outer tube 30 comprises a tube body 32, a grip 34, a locating plate 36, and a barrel 38. The tube body 32 is sleeved onto the other end of the inner tube 20, comprising a first through hole 322 and a mounting slot 324. The grip 34 is capped onto one end of the tube body 32, comprising a second through hole 342 disposed in communication with the first through hole 322. The locating plate 36 is mounted in the mounting slot 324 of the tube body 32 and comprises a post 362. The barrel 38 is sleeved onto the other end of the tube body 32 and connected to the locating plate 36.

The slide seat 40 is mounted in the longitudinal sliding groove 22 of the inner tube 20 and comprises a bottom wall 42, a first end wall 44, a second end wall 46, and a partition wall 48. The bottom wall 42 defines therein a mounting hole 422, an elongated slot 424, and a through hole 426. The first end wall 44 is located on one end of the bottom wall 42 and defines a through hole 442. The second end wall 46 is located on an opposite end of the bottom wall 42 and defines a recessed hole 462. The partition wall 48 is located on the middle of the bottom wall 42 between the elongated slot 424 and the through hole 426. During installation, the recessed hole 462 of the second end wall 46 of the slide seat 40 is forced into engagement with the post 362 of the locating plate 36 of the outer tube 30, enabling the slide seat 40 to be moved by the outer tube 30 along the longitudinal sliding groove 22.

Figure 4:
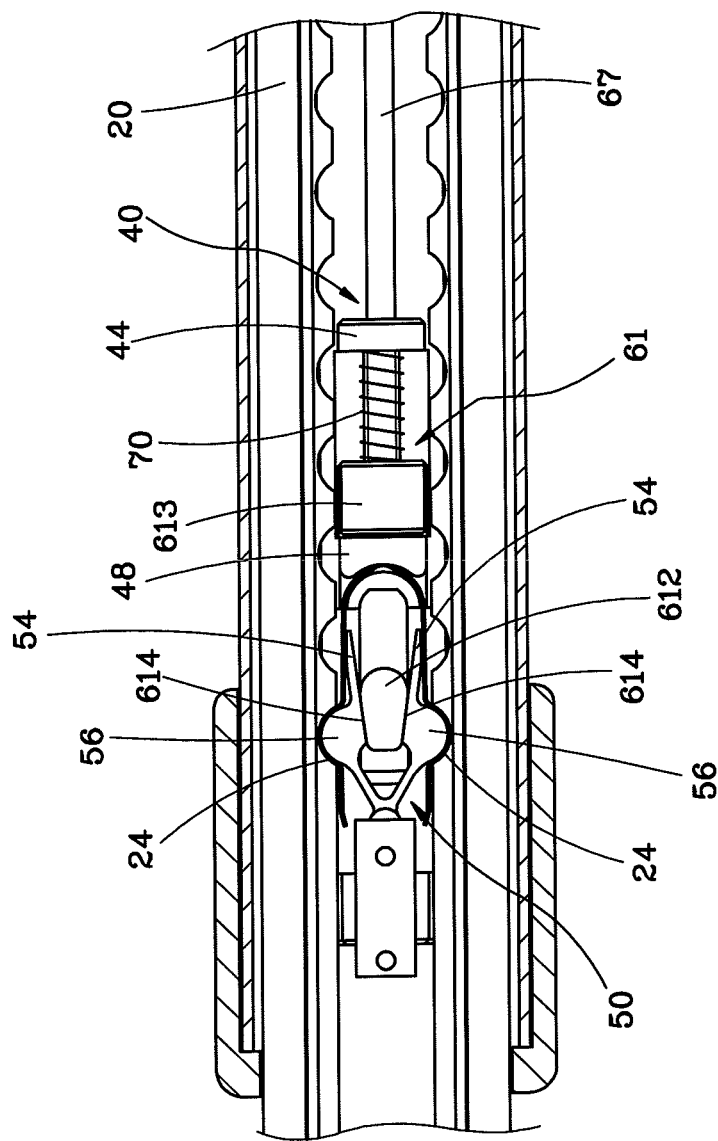
FIG. 4 is a sectional top view of a part of the first embodiment of the present invention, illustrating the positioning protrusions of the positioning spring leaf engaged with the two series of locating notches of the inner tube.

As shown in FIGS. 2 and 4, the positioning spring leaf 50 comprises a mounting axle 52, two first arm portions 54, and two positioning protrusions 56. The mounting axle 52 is plugged into the locating hole 422 of the bottom all 42 of the slide seat 40 to secure the positioning spring leaf 50 to the slide seat 40. The two first arm portions 54 are respectively outwardly extended from the mounting axle 52. The two positioning protrusions 56 are respectively outwardly protruded from the two first arm portions 54 in a direction toward the two series of locating notches 24 of the inner tube 20.

Figure 3:
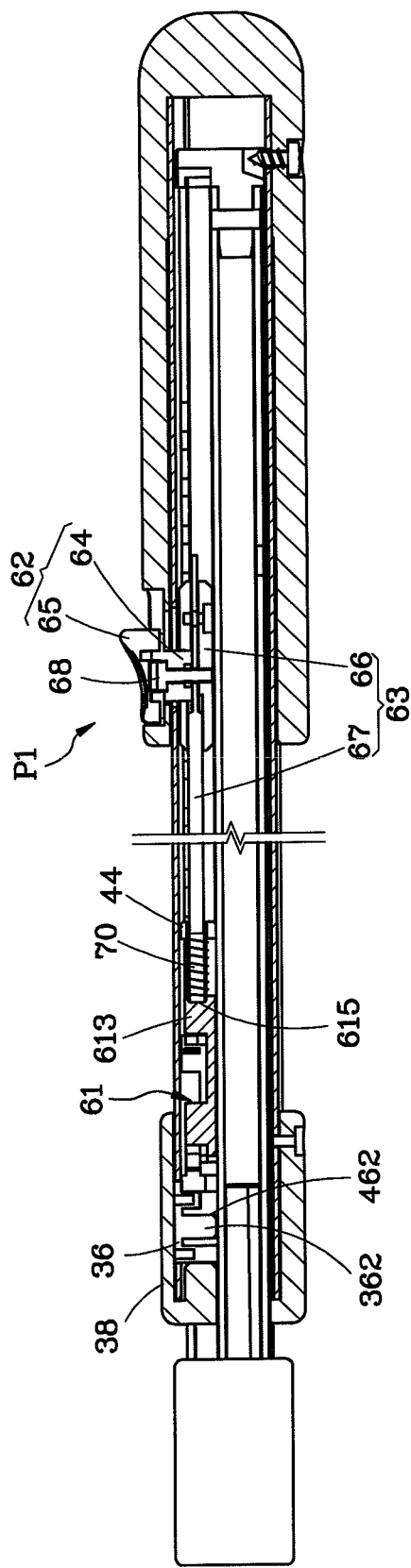
FIG. 3 is a sectional side view of the first embodiment of the present invention, illustrating the push button in the first position.

As shown in FIGS. 2-4, the control device 60 comprises a movable member 61, a push button 62, and a linking device 63. The movable member 61 is mounted in the longitudinal sliding groove 22 of the inner tube 20 and comprises a base 611, a push block 612, and a raised block 613. The push block 612 is located on one end of the base 611 and defines two bevel faces 614. The raised block 613 is upwardly protruded from the other end of the base 611 and defines a screw hole 615. During installation, the push block 61 of the movable member 61 is inserted into the elongated slot 424 of the slide seat 40 to abut the two bevel faces 614 against the respective inner sides of the first arm portions 54 of the positioning spring leaf 50 and to have the raised block 613 be inserted into the through hole 426 of the slide seat 40. The push button 62 comprises a bearing block 64 and a top cover 65. The bearing block 64 is set between the first through hole 322 of the tube body 32 of the outer tube 30 and the second through hole 342 of the grip 34. The top cover 65 is affixed to the top wall of the bearing block 64 and exposed to the outside of the second through hole 342 of the grip 34. The linking device 63 in this embodiment comprises a locating block 66 and a link 67. The locating block 66 is affixed to the bottom wall of the bearing block 64 by a screw 68. The link 67 comprises opposing first end 672 and second end 674. The first end 672 is affixed to the locating block 66. The second end 674 is a screw rod inserted through the through hole 442 of the first end wall 44 of the slide seat 40 and threaded into the screw hole 615 of the raised block 613 of the movable member 61. Thus, the linking device 63 can be driven by the push button 62 to move the movable member 61 relative to the slide seat 40.

The elastic member 70 is sleeved onto the second end 674 of the link 67 of the linking device 63 and stopped with its two opposite ends against the first end wall 44 of the slide seat 40 and the raised block 613 of the movable member 61 to impart a force to the movable member 61 toward the positioning spring leaf 50.

Figure 5:
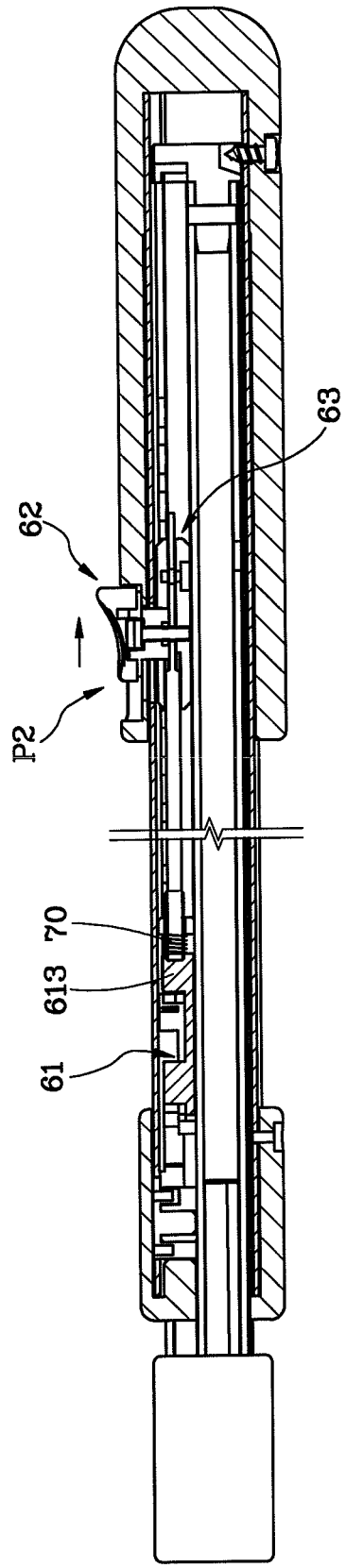
FIG. 5 is similar to FIG. 3, illustrating the push button in the second position.
Figure 6:
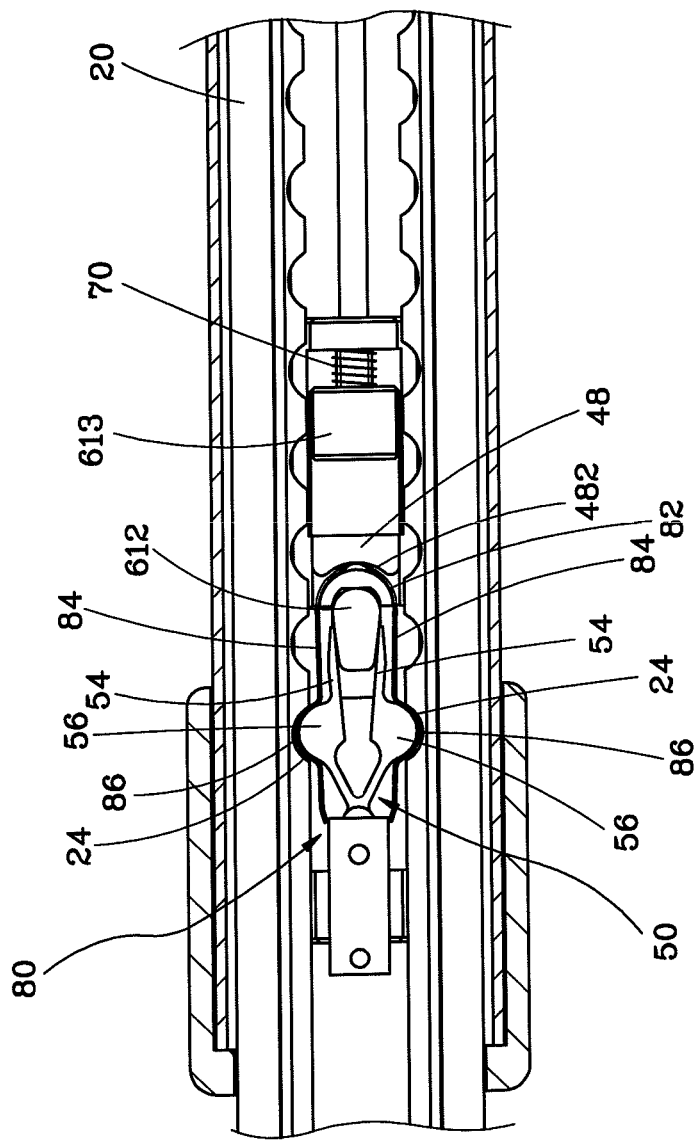
FIG. 6 is similar to FIG. 4, illustrating the positioning protrusions of the positioning spring leaf disengaged from the two series of locating notches of the inner tube.
Figure 7:
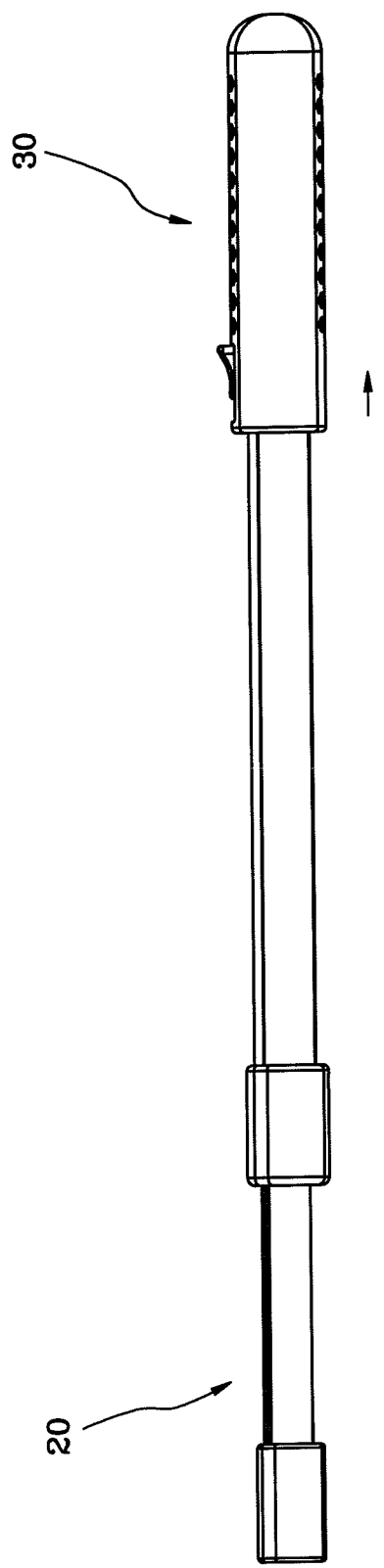
FIG. 7 is a side view of the first embodiment of the present invention, illustrating the length of the push button-controlled retractable bar adjusted.

When the user is going to adjust the length of the push button-controlled retractable bar 10, as shown in FIG. 5, the user can use the thumb to push the push button 62 from a first position P1 shown in FIG. 3 to a second position P2 shown in FIG. 5, forcing the linking device 63 to move the movable member 61 in a direction away from the positioning spring leaf 50. At this time, the raised block 613 of the movable member 61 will compress the elastic member 70, and the push block 612 of the movable member 61 will release the pressure from the first arm portions 54 of the positioning spring leaf 50, enabling the first arm portions 54 of the positioning spring leaf 50 to retreat subject to its elastic restoring force and to disengage the respective positioning protrusions 56 from the respective series of locating notches 24 of the inner tube 20, as shown in FIG. 6. Thus, the user can move the slide seat 40 along the longitudinal sliding groove 22 to carry the outer tube 30 relative to the inner tube 20, adjusting the push button-controlled retractable bar 10 to a desired length, as shown in FIG. 7.

After the push button-controlled retractable bar 10 has been adjusted to the desired length, the user can release the hand from the push button 62. At this time, the elastic member 70 will push the movable member 61 in a direction toward the positioning spring leaf 50. During the movement of the movable member 61, the linking device 63 will be forced to carry the push button 62 from the second position P2 back to the first position P1, and at this time, the push block 612 of the movable member 61 will push the first arm portions 54 of the positioning spring leaf 50 outwards to force the respective positioning protrusions 56 into engagement with the respective series of locating notches 24 of the inner tube 20, as shown in FIG. 4, locking the outer tube 30 in the adjusted position.

Further, in order to enable the positioning protrusions 56 of the positioning spring leaf 50 to be accurately disengaged from the respective series of locating notches 24 of the inner tube 20, the push button-controlled retractable bar 10 further provides a return leaf spring 80, as shown in FIGS. 2 and 6. The return leaf spring 80 comprises a mounting portion 82, two second arm portions 84, and two abutment portions 86. The mounting portion 82 is fastened to a slit 482 at the partition wall 48 of the slide seat 40. The two second arm portions 84 are respectively extended from two opposite ends of the mounting portion 82 in a direction toward the positioning spring leaf 50. The two abutment portions 86 are respectively located on the distal ends of the second arm portions 84 and positioned between the two series of locating notches 24 of the inner tube 20 and the positioning protrusions 56 of the positioning spring leaf 50. Thus, when the push button 62 is moved to the second position P2, the positioning protrusions 56 of the positioning spring leaf 50 will be accurately forced away from the series of locating notches 24 of the inner tube 20 not only by the elastic restoring force of the first arm portions 54 of the positioning spring leaf 50 but also by the push force of the abutment portions 86 of the return leaf spring 80, avoiding interference between the positioning protrusions 56 of the positioning spring leaf 50 and the series of locating notches 24 of the inner tube 20.

Figure 8:
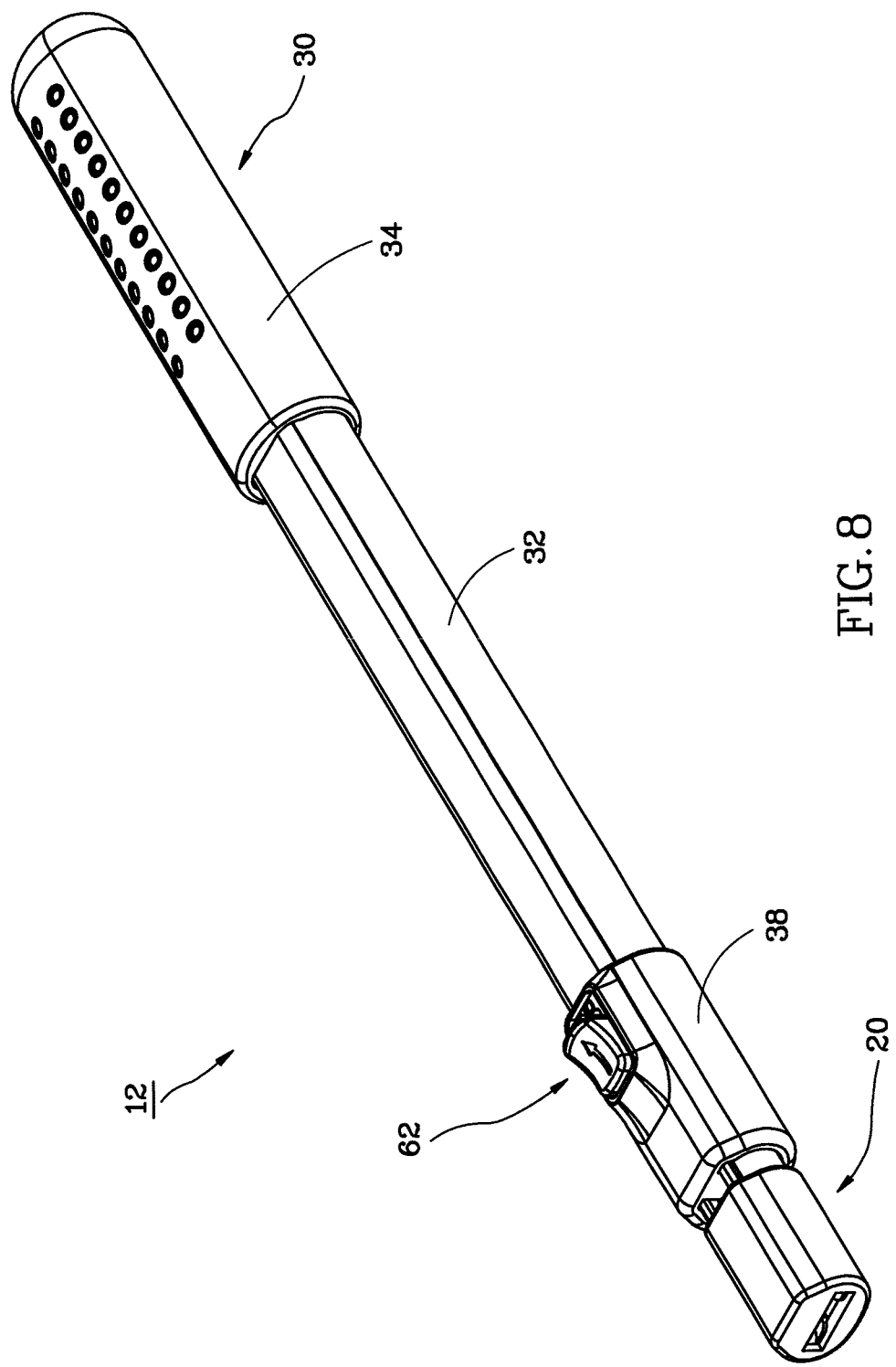
FIG. 8 is a perspective view of a push button-controlled retractable bar in accordance with a second embodiment of the present invention.
Figure 9:
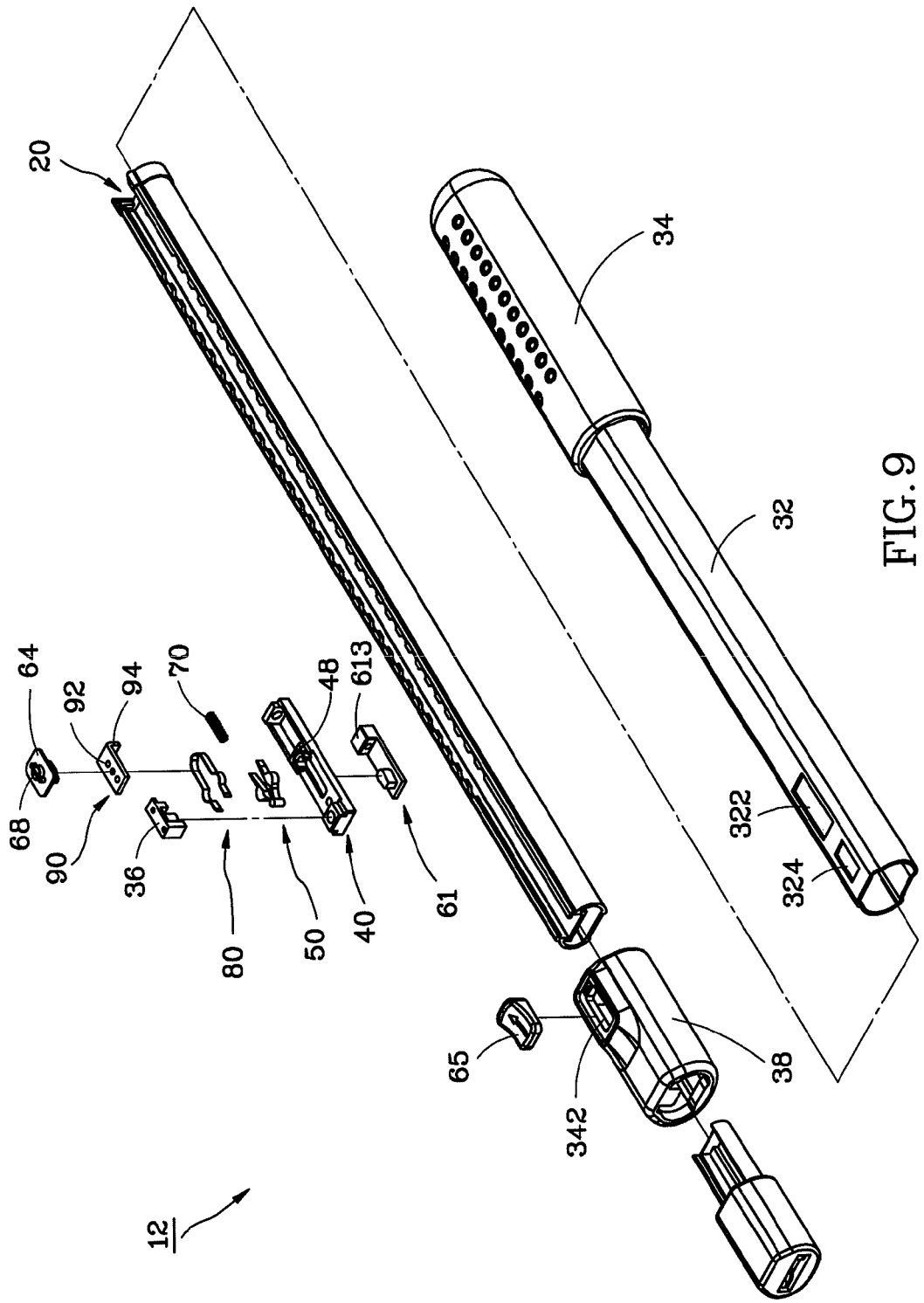
FIG. 9 is an exploded view of the push button-controlled retractable bar in accordance with the second embodiment of the present invention.

Referring to FIGS. 8 and 9, a push button-controlled retractable bar 12 in accordance with a second embodiment of the present invention is shown. This second embodiment is substantially similar to the aforesaid first embodiment with the exception of the design of the outer tube 30 and the linking device 90.

The tube body 32 of the outer tube 30 is sleeved onto one end of the inner tube 20 and comprises a first through hole 322 and an adjacent mounting slot 324. The barrel 38 of the outer tube 30 is sleeved onto one end of the tube body 32 and comprises a second through hole 342 kept in communication with the first through hole 322. The grip 34 of the outer tube 30 is capped onto the other end of the tube body 32. The locating plate 36 of the outer tube 30 is mounted in the mounting slot 324 of the tube body 32 and connected to the barrel 38 and the slide seat 40.

The push button 62 of the control device 60 is set between the first through hole 322 of the tube body 32 of the outer tube 30 and the second through hole 342 of the barrel 38. The top cover 65 of the push button 62 is fixedly mounted at the top side of the bearing block 64 and exposed to the outside of the second through hole 342 of the barrel 38. The linking device 90 of this second embodiment comprises a top wall 92 and a push wall 94. The top wall 92 is affixed to the bearing block 64 of the push button 62 by a screw bolt 68. The push wall 94 extends from one end of the top wall 92 in a direction toward the slide seat 40 and into the space between the partition wall 48 of the slide seat 40 and the raised block 613 of the movable member 61, as shown in FIG. 10.

Figure 10:
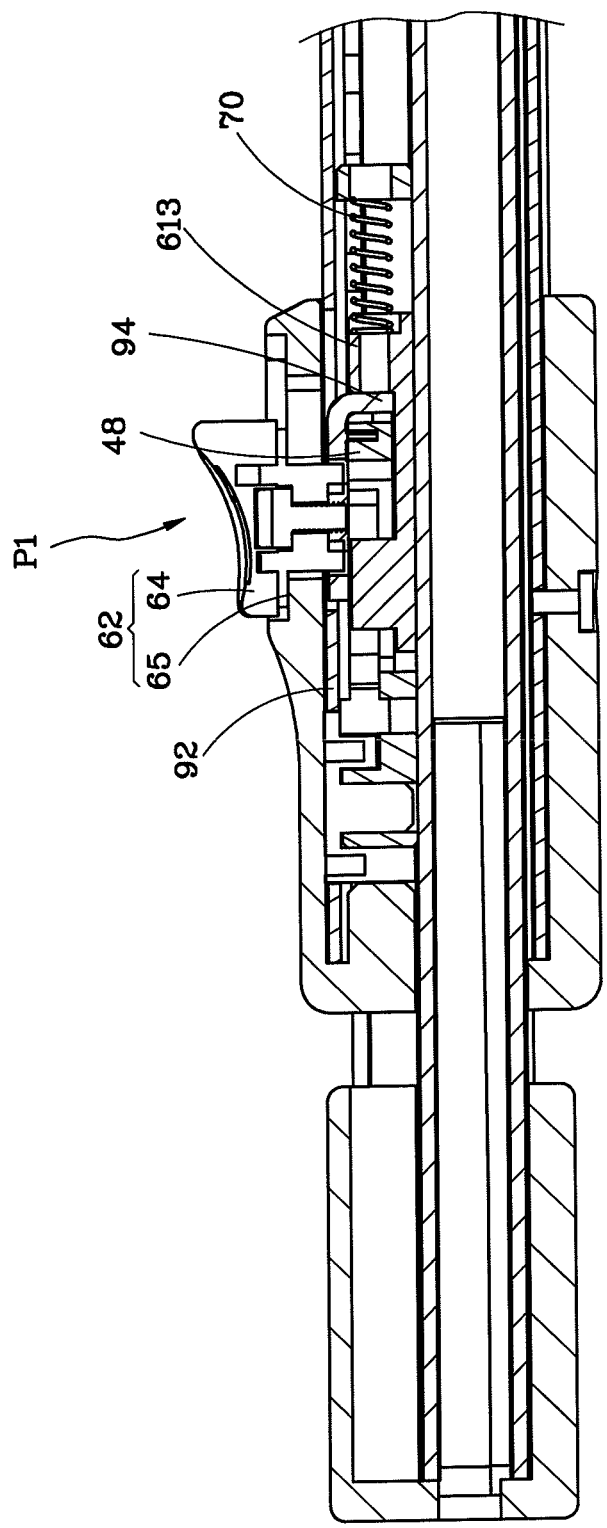
FIG. 10 is a sectional side view of a part of the second embodiment of the present invention, illustrating the push button in the first position.
Figure 11:
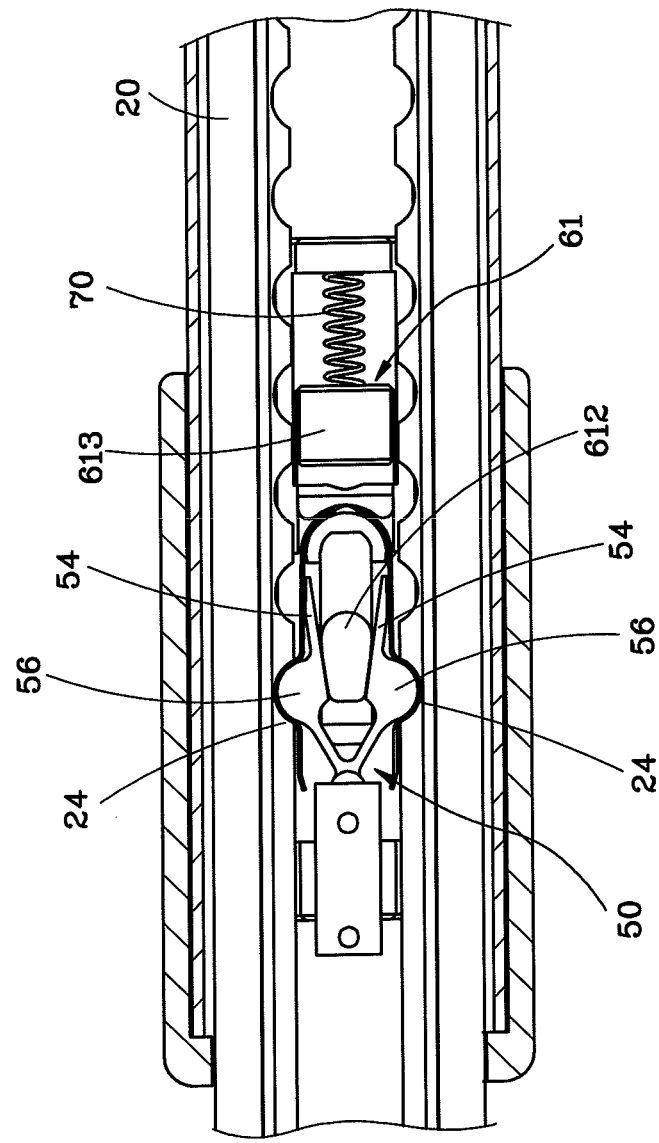
FIG. 11 is a top view of a part of the second embodiment of the present invention, illustrating the positioning protrusions of the positioning spring leaf engaged with the two series of locating notches of the inner tube.
Figure 12:
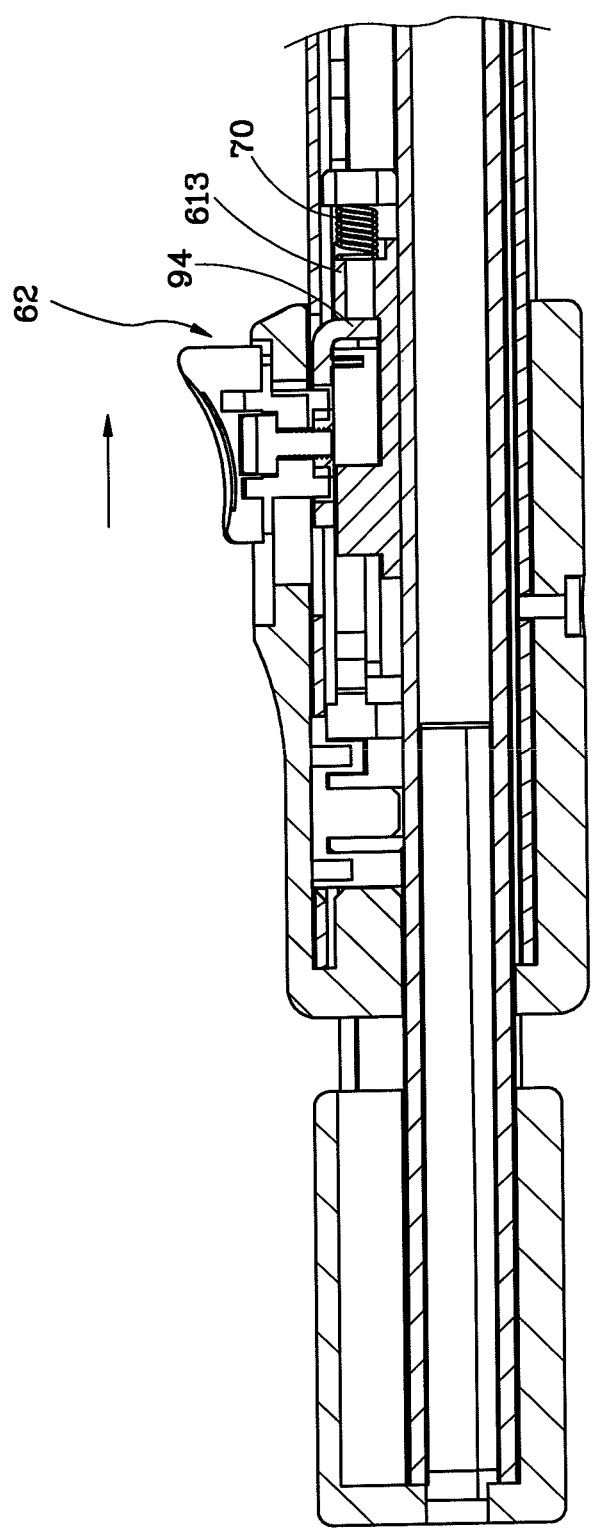
FIG. 12 is similar to FIG. 10, illustrating the push button in the second position.
Figure 13:
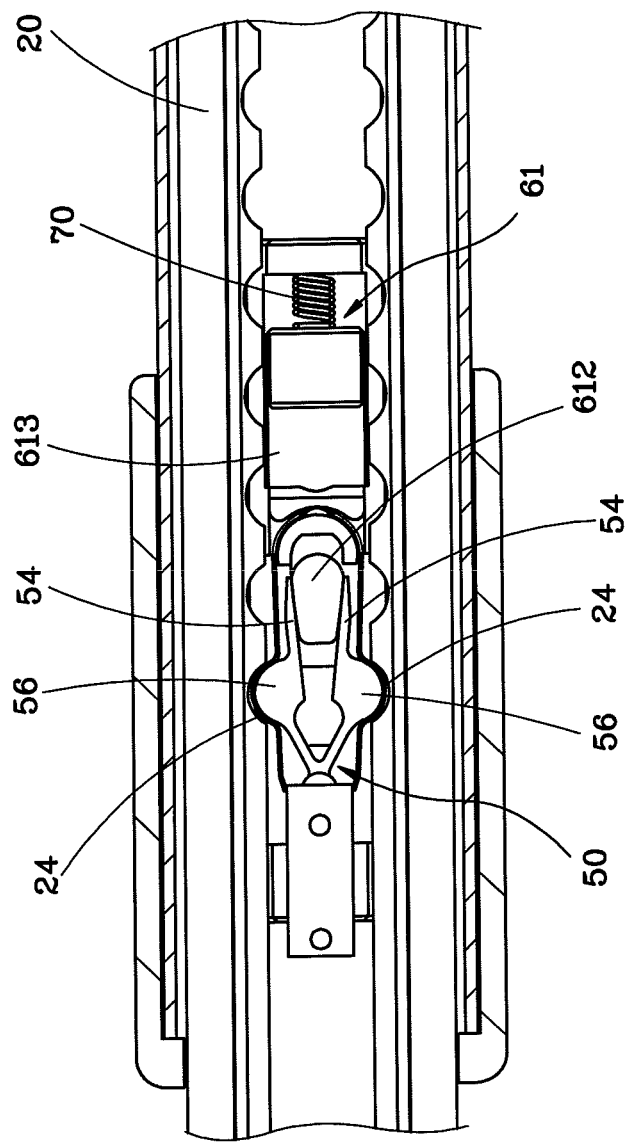
FIG. 13 is similar to FIG. 11, illustrating the positioning protrusions of the positioning spring leaf disengaged from the two series of locating notches of the inner tube.

Thus, when the user pulls the push button 62 from a first position P1 shown in FIG. 10 to a second position P2 shown in FIG. 12, the push wall 94 of the linking device 90 will be forced against the raised block 613 of the movable member 61 to move the movable member 61 in a direction away from the positioning spring leaf 50 and to compress the elastic member 70, as shown in FIG. 13. At the same time, the push block 612 of the movable member 61 will release the pressure from the first arm portions 54 of the positioning spring leaf 50, enabling the first arm portions 54 of the positioning spring leaf 50 to retreat subject to its elastic restoring force and to disengage the respective positioning protrusions 56 from the respective series of locating notches 24 of the inner tube 20. Thus, the user can move the outer tube 30 relative to the inner tube 20 to adjust the push button-controlled retractable bar 12 to a desired length. After the push button-controlled retractable bar 12 has been adjusted to the desired length, the user can release the hand from the push button 62. At this time, the elastic member 70 will push the movable member 61 in a direction toward the positioning spring leaf 50, causing the raised block 613 of the movable member 61 to move the push wall 94 of the linking device 90 in carrying the push button 62 from the second position P2 back to the first position P1, and at this time, the push block 612 of the movable member 61 will push the first arm portions 54 of the positioning spring leaf 50 outwards to force the respective positioning protrusions 56 into engagement with the respective series of locating notches 24 of the inner tube 20, as shown in FIG. 11, locking the outer tube 30 in the adjusted position. Further, the aforesaid return leaf spring 80 can also be used in the push button-controlled retractable bar 12 of this second embodiment of the present invention.

In conclusion, the push button-controlled retractable bar in accordance with the present invention uses the push button, the linking device and the slide seat to move the positioning protrusions of the positioning spring leaf into engagement with, or away from, the respective series of locating notches of the inner tube accurately, facilitating length adjustment. When compared to the prior art design, the push button-controlled retractable bar of the invention has the characteristic of simple structure.

What is claimed is:

1. A push button-controlled retractable bar, comprising:
an inner tube comprising a longitudinal sliding groove and at least one series of locating notches located on at least one of two opposite sidewalls of said longitudinal sliding groove and spaced along an axial direction of said inner tube;
an outer tube axially movably sleeved onto said inner tube;
a slide seat movably mounted in said longitudinal sliding groove and affixed to said outer tube, said slide seat comprising an elongated slot;
a positioning spring leaf comprising a mounting axle affixed to said slide seat, at least one first arm portion outwardly extended from said mounting axle, and at least one positioning protrusion outwardly protruded from said at least one first arm portion in a direction toward said at least one series of locating notches of said inner tube;
a control device comprising a movable member movably mounted in said longitudinal sliding groove of said inner tube, a push button, and a linking device set between said movable member and said push button, said movable member comprising a push block inserted into said elongated slot of said slide seat and abutted against said at least one first arm portion of said positioning spring leaf, said push button being mounted in said outer tube and movable between a first position where said push block of said movable member pushes said at least one first arm portion of said positioning spring leaf to force said at least one positioning protrusion into engagement with said at least one series of locating notches of said inner tube and a second position where said push button pushes said linking device to carry said movable member in a direction away from said positioning spring leaf for enabling said positioning spring leaf to move said at least one positioning protrusion away from said at least one series of locating notches of said inner tube subject to an elastic restoring force thereof; and
an elastic member set between said slide seat and said movable member and adapted to push said movable member in a direction toward said positioning spring leaf.

2. The push button-controlled retractable bar as claimed in claim 1, wherein said slide seat comprises an end wall defining a through hole; said movable member comprised a raised block defining a screw hole; said linking device comprises a locating block and a link, said link comprising a first end fixedly connected to said locating block and a threaded second end inserted through the through hole of said slide seat and threaded into the screw hole of said movable member; said push button is fixedly mounted at said locating block of said linking device; said elastic member is sleeved onto the threaded second end of said link of said linking device and stopped between said end wall of said slide seat and said raised block of said movable member.

3. The push button-controlled retractable bar as claimed in claim 2, wherein said outer tube comprises a tube body and a grip, said tube body being sleeved onto said inner tube and comprising a first through hole, said grip being capped onto one end of said tube body and comprising a second through hole disposed in communication with the first through hole of said tube body; said push button is mounted in said first through hole of said tube body of said outer tube and said second through hole of said grip.

4. The push button-controlled retractable bar as claimed in claim 3, wherein said push button comprises a bearing block fixedly mounted at said locating block of said linking device and set between said first through hole of said tube body of said outer tube and said second through hole of said grip, and a top cover affixed to a top wall of said bearing block and exposed to an outside of said second through hole of said grip.

5. The push button-controlled retractable bar as claimed in claim 3, wherein said tube body of said outer tube comprises a mounting slot disposed remote from said first through hole; said outer tube further comprises a barrel sleeved onto an opposite end of said tube body of said outer tube and a locating plate affixed to said barrel and mounted in said mounting slot of said tube body of said outer tube and connected to said slide seat.

6. The push button-controlled retractable bar as claimed in claim 5, wherein said slide seat comprises a recessed hole; said locating plate comprises a post engaged in said recessed hole of said slide seat.

7. The push button-controlled retractable bar as claimed in claim 1, wherein said raised block of said movable member is positioned between an end wall and a partition wall of said slide seat; said linking device comprises a top wall affixed to said push button, and a push wall extended from one end of said top wall in a direction toward said slide seat and inserted into a space between said partition wall of said slide seat and said raised block of said movable member; said elastic member has two opposite ends respectively stopped against said end wall of said slide seat and said raised block of said movable member.

8. The push button-controlled retractable bar as claimed in claim 7, wherein said outer tube comprises a tube body, a barrel and a grip, said tube body being sleeved onto said inner tube and comprising a first through hole, said barrel being sleeved onto one end of said tube body and comprising a second through hole kept in communication with said first through hole, said grip being capped onto an opposite end of said tube body; said push button is mounted in said first through hole of said tube body and said second through hole of said barrel.

9. The push button-controlled retractable bar as claimed in claim 8, wherein said push button comprises a bearing block fixedly mounted at said top wall of said linking device and set between said first through hole of said tube body and said second through hole of said grip, and a top cover affixed to a top side of said bearing block and exposed to an outside of said second through hole of said grip.

10. The push button-controlled retractable bar as claimed in claim 9, wherein said tube body of said outer tube comprises a mounting slot disposed adjacent to said first through hole; said outer tube further comprises a locating plate affixed to said barrel and mounted in said mounting slot of said tube body of said outer tube and connected to said slide seat.

11. The push button-controlled retractable bar as claimed in claim 10, wherein said slide seat comprises a recessed hole; said locating plate comprises a post engaged in said recessed hole of said slide seat.

12. The push button-controlled retractable bar as claimed in claim 1, wherein said inner tube comprises two series of locating notched respectively located on the two opposite sidewalls of said longitudinal sliding groove; said positioning spring leaf comprises two first arm portions respectively outwardly extended from said mounting axle, and two positioning protrusions respectively outwardly protruded from said two first arm portions; said push block of said movable member is set between said two first arm portions of said positioning spring leaf.

13. The push button-controlled retractable bar as claimed in claim 12, wherein said push block comprises two bevel faces respectively abutted against said two first arm portions of said positioning spring leaf.

14. The push button-controlled retractable bar as claimed in claim 1, further comprises a return leaf spring mounted at said slide seat and adapted to push said at least one positioning protrusion of said positioning spring leaf in a direction away from said at least one series of locating notches of said inner tube.

15. The push button-controlled retractable bar as claimed in claim 14, wherein said slide seat comprises a partition wall defining a slit; said return leaf spring comprises a mounting portion fastened to said slit of said partition wall of said slide seat, at least one second arm portion extended from said mounting portion in a direction toward said positioning spring leaf, and at least one abutment portion located on a distal end of said at least one second arm portion and positioned between said at least one series of locating notches of said inner tube and said at least one positioning protrusion of said positioning spring leaf.

16. The push button-controlled retractable bar as claimed in claim 15, wherein said inner tube comprises two series of locating notched respectively located on the two opposite sidewalls of said longitudinal sliding groove; said positioning spring leaf comprises two first arm portions respectively outwardly extended from said mounting axle, and two positioning protrusions respectively outwardly protruded from said two first arm portions; said push block of said movable member is set between said two first arm portions of said positioning spring leaf; said return leaf spring comprises two second arm portions respectively extended from said mounting portion in a direction toward said positioning spring leaf, and two abutment portions respectively located on a respective distal end of each of said two second arm portions and respectively positioned between said two series of locating notches of said inner tube and said two positioning protrusions of said positioning spring leaf.

17. The push button-controlled retractable bar as claimed in claim 16, wherein said push block comprises two bevel faces respectively abutted against said two first arm portions of said positioning spring leaf.

\* \* \* \* \*